United States Patent [19]

Davies

[11] 4,109,293
[45] Aug. 22, 1978

[54] TUBULAR CONDUCTOR FOR METAL CLAD SWITCHGEAR

[75] Inventor: Norman Davies, Levelgreen, Pa.

[73] Assignee: Westinghouse Electric Corp., Pittsburgh, Pa.

[21] Appl. No.: 768,938

[22] Filed: Feb. 15, 1977

[51] Int. Cl.² .............................................. H02B 1/04
[52] U.S. Cl. ..................................... 361/341; 174/945
[58] Field of Search ........................... 339/22 R, 22 B;
174/68 B, 68 C, 70 B, 71 B, 845, 945, 99 B;
361/334, 335, 336, 341, 342, 390, 391

[56] References Cited

U.S. PATENT DOCUMENTS

| | | | |
|---|---|---|---|
| 2,376,818 | 5/1945 | Rubel | 174/65 R |
| 3,398,327 | 8/1968 | Ferris | 361/341 |
| 3,793,562 | 2/1974 | Cleaveland | 361/336 |

Primary Examiner—Gerald P. Tolin
Attorney, Agent, or Firm—M. J. Moran

[57] ABSTRACT

A hollow, cylindrical, copper, tubular conductor is taught. One end of the tubular conductor is beveled or rounded off for convenient insertion into a fingered circular disconnecting contact for circuit interrupter apparatus. The other end of the tubular conductor is spun or bent over a captured circular flange. The circular flange has tapped holes or push nuts inserted therein through which bolts may be threaded. A flat bus bar riser having corresponding holes therein is abutted against the flattened end of the tubular conductor at right angles thereto and securely fastened thereto by bolts which extend through the complementary holes into the flange. A method is taught for securing the flange to the copper tube and for attaching the riser thereto.

7 Claims, 4 Drawing Figures

TUBULAR CONDUCTOR FOR METAL CLAD SWITCHGEAR

BACKGROUND OF THE INVENTION

1. Field of the Invention

The subject matter of this invention is related generally to metal clad switchgear apparatus and is related more particularly to the utilization of hollow, tubular, cylindrical conductors for carrying high voltage electrical current.

2. Description of the Prior Art

Metal clad switchgear is well known in the prior art. A typical example may be found in U.S. Pat. No. 2,363,364, issued Nov. 21, 1944 to H. H. Rugg. Another example may be found in U.S. Pat. No. 2,424,345, issued July 22, 1947 to C. P. West. Typically, metal clad switchgear apparatus is utilized because of its inherent safety features. In a typical case — a completely enclosed metal cabinet has three compartments; into one compartment, usually in the back of the cabinet, a high voltage electrical conductor is provided. In still another compartment, also usually in the back, but separated from the first compartment, a high voltage line, which is connected to a load, is provided. The load is, of course, external to the switchgear. Electrically interposed between conductors in the latter two compartments in disconnectable arrangement is circuit switching or circuit interrupting apparatus. The circuit interrupting apparatus opens or closes the circuit which exists between the conductors of the first mentioned two compartments. Furthermore, the circuit disconnecting apparatus may be physically removed from the metal clad switchgear apparatus for maintenance and repair. It has been found in the past that the terminals for the circuit interrupter apparatus operate very advantageously if they comprise radially spaced spring-loaded fingers which apply radial force to a conductor of circular cross-section. Such an arrangement is shown in U.S. Pat. No. 2,376,818, issued May 22, 1945 to M. J. Rubel. Furthermore, it has been advantageous in the past to interface the high voltage line side of the switchgear apparatus to high voltage transformers or the like by utilizing rectangularly shaped copper or aluminum bus bars. Such an arrangement is shown for example in U.S. Pat. No. 3,793,564, issued Feb. 19, 1974 to J. G. Salvati. A problem arises in connecting a rectangular bus bar with a circular conductor such as is provided for accommodating the circular fingered terminal of the previously mentioned Rubel U.S. Pat. No. 2,376,818. One way of avoiding the problem in the past has been to use only rectangularly shaped connecting means. Such an arrangement is shown in U.S. Pat. No. 3,746,817, issued July 17, 1973 to Drown et al; however, this prevents the use of the highly desirable circular finger arrangement of the Rubel patent. Furthermore, it has been found to be advantageous to use circular stud means, especially hollow cylindrical copper circular stud means, for mating with the finger arrangement of the Rubel patent for instance. The reasons for this are many. One reason lies in the fact that the relative surface area to volume of a conductor of circular cross section provides an optimum heat dissipating characteristic for the conductor. Another advantage lies in the fact that alternating current, even at the relatively low frequency of 60 Hz. follows the skin effect principle where a relatively large percentage of the current flows in the outer portion of a conductor. Consequently, the utilization of a hollow circular tubular conductor increases the efficiency of the conductor. Still another advantage lies in the fact that circular conductors by nature theoretically have no sharp discontinuities therein, such as a rectangular conductor would have, and are thus ideally suited for high voltage applications where corona is a problem. Ways of joining relatively flat rectangular conductors to circular conductors are described in various degrees in the following U.S. Pat. Nos.: 2,090,940, issued Aug. 24, 1973 to H. D'Olier; 3,303,293, issued Feb. 7, 1967 to Howel; and Re. U.S. Pat. No. 13,475, reissued Oct. 8, 1912 to Robinson. The three latter mentioned patents, although somewhat related to the interconnection of bus bars or circular conductors or the combination of both, are provided here mainly as background. On the other hand, U.S. Pat. No. 2,950,456, issued Aug. 23, 1960 to R. H. Rehdef, shows the interconnection of bus bars having right angle bends therein with circular conductors. In that case, attachment is provided by longitudinally splitting the circular conductor in a radial plane, inserting a bus bar longitudinally therein and then radially disposing bolts through the circular conductor at right angles to the broadest plane of the bus bar. This construction has a number of disadvantages, one of which lies in the relative amount of surface area of circular conductor which is available to conduct current at the interface between the circular conductor and the bus bar. Another is a potential mechanical relaxation of the circular conductor with time which would have a tendency to loosen the radially disposed bolts. Another disadvantage lies in the intricacy with which the insertion of the bus bar in the longitudinal slot and the bolting of the bus bar to the circular conductor must be accomplished. A similar disadvantage is associated with the prior art shown in FIG. 2 of the drawings of the present application in which one end of a circular conductor is threaded and the bus bar is correspondingly drilled and tapped and then rotated or revolved upon the threaded circular conductor. A separate securing operation is required thereafter for fixedly securing the bus bar in place on the threaded circular conductor for efficient current transferring therebetween.

SUMMARY OF THE INVENTION

In accordance with the invention, switchgear apparatus is taught having a circular hollow tubular conductor connected at right angles to a relatively flat rectangular riser or bus bar. The tubular conductor has a radial portion thereof machined or otherwise removed from the inner wall thereof near one end of the tubular conductor. A corresponding circular flange, preferably made of steel, is inserted into the milled away portion against the shoulder formed by the milling operation. The remaining portion of the end tube is then spun over or otherwise bent over the inserted steel flange, thus securely holding it against the previously described shoulder. Appropriate holes or openings are placed in the steel flange and are either tapped or provided with push nuts so that a bus bar may be abutted at right angles to the bent over portion of the tube and then bolted to the flange by utilizing appropriate bolts and corresponding holes in the bus bar. This operation utilizes the entire surface area of the spun over or bent over portion of the tube. In addition, the compressive characteristic of the bolt operating in conjunction with the flange compresses the bus bar against the bent over portion, providing an excellent current transferring interface between the bus bar and the tube.

BRIEF DESCRIPTION OF THE DRAWINGS

For a better understanding of the invention, reference may be had to the preferred embodiments thereof shown in the accompanying drawings, in which.

DESCRIPTION OF THE PREFERRED EMBODIMENT

Figure 1:
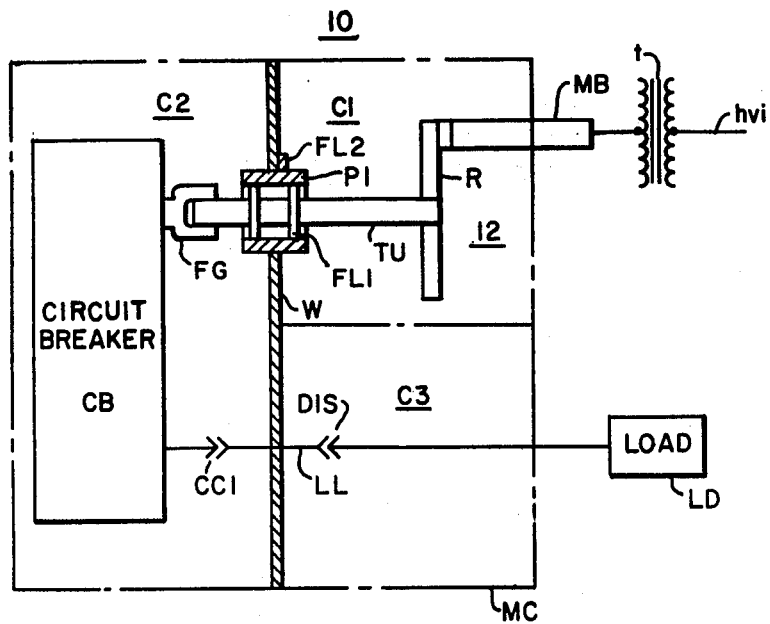
FIG. 1 shows a block diagram partially in schematic form of a high voltage metal clad switchgear cabinet which utilizes the inventive concepts taught herein.

Referring now to the drawings, and to FIG. 1 in particular, a schematic block diagram of a metal clad switchgear enclosure or cabinet 10 is shown. The metal clad switchgear enclosure 10 comprises a metal clad cabinet MC having three distinct compartments, C1, C2, and C3. Compartment C1 may be thought of as an input compartment; compartment C2 may be thought of as a circuit function compartment; and compartment C3 may be thought of as an output compartment. A high voltage input line $hvi$ is provided to a transformer $t$ which in turn is connected to a main bus conductor MB. The high voltage input line $hvi$ and the transformer $t$ may be located outside of the metal cabinet MC. The bus MB feeds through an appropriate opening in the metal cabinet MC to compartment C1. Therein, a bus bar riser R is connected to the main bus MB. Such an arrangement may be exemplified by that shown in the previously described U.S. Pat. No. 3,793,564. Connected to the riser R in a region 12, in a preferred embodiment of the invention is one end region of a hollow, cylindrical, copper tube TU. The other end region of the copper tube TU protrudes through a wall W in the cabinet MC from the compartment C1 to the compartment C2 where it is mechanically interconnected with circuit controlling apparatus such as the circuit breaker CB. In a preferred embodiment of the invention, the circuit breaker or circuit interrupter CB is disconnectable from the tube TU. The disconnectable connecting apparatus or terminal for the circuit breaker CB of the tube TU may preferably be a fingered connecting arrangement FG, such as is shown in the previously described U.S. Pat. No. 2,376,818. An appropriate disconnecting terminal CC1 is shown for the other terminal of the circuit breaker apparatus CB. Terminal CC1 in turn connects to a line LL which may have still another disconnecting means schematically shown at DIS therein. Line LL feeds through the output or load voltage compartment C3 and ultimately to region outside of the metal clad switchgear MC where it is connected to an appropriate load LD.

In a preferred embodiment of the invention, the tube TU is supported within a porcelain insulator PI which traverses the wall W between the compartments C1 and C2. The tube TU is held in place centrally in the porcelain insulator PI by flange arrangements FL1, where flange FL1 may comprise a fiberglass insulating support member. An externally mounted flange FL2, which may be made of steel or a similar rugged construction material, is glued or otherwise conveniently attached to the porcelain insulator PI. The flange FL2 is utilized with bolts or similar mounting apparatus to dispose the assembled porcelain insulator arrangement fixedly against the wall W, to in turn support the tube TU. It is in the region 12 of the interface between the circular hollow cylindrical tube TU and the relatively flat riser R which is disposed at right angles thereto that an embodiment of the present invention is utilized.

Figure 2:
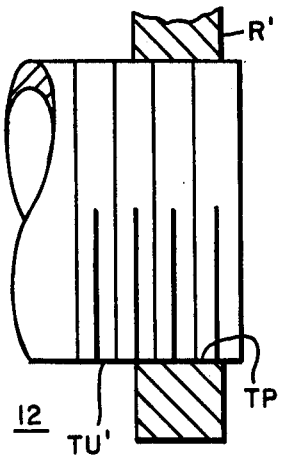
FIG. 2 shows a prior art connection for one region of the switchgear apparatus of FIG. 1 where a circular tube interfaces with a rectangular riser.

FIG. 2 shows a prior art connecting arrangement for a circular cylindrical tube TU' and a relatively flat rectangularly sectioned bus bar R' in the region 12. The end of the tube TU' is threaded and inserted into a drilled and tapped hole TP in the bus bar riser R'. The various drilling, tapping and threading operations are relatively intricate, difficult and expensive, and the physical installation of the tube TU' in the riser R' is complicated by the mass and bulk of the riser R'. Typically, a jig must be used for proper assembly of the tube TU' to the riser R'. In addition, it has been found that the electrical interfacing properties of a threaded tube in a tapped hole are such that auxiliary clamping means (not shown) is required for good electrical conduction. This, of course, reduces the contact resistance which is often a problem when joining two conductors one to the other.

Figure 3:
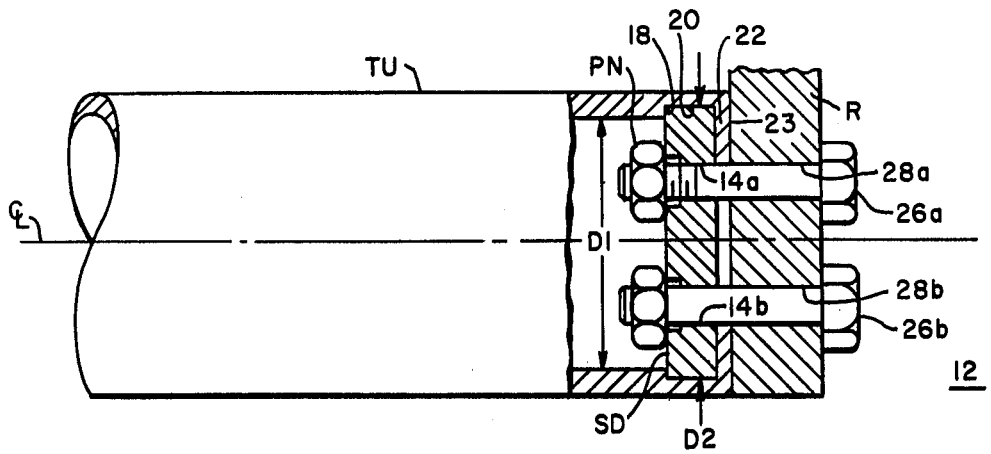
FIG. 3 shows one embodiment of the present invention in elevation and in section for the region where the circular tube is connected to the bus bar riser cabinet of FIG. 1.

Referring now to FIG. 3, the interconnection of the copper tube TU and the riser R of region 12 of FIG. 1 utilizing the inventive concepts of the present invention is shown. In this case, the copper tube TU prior to assembly is milled or otherwise machined or formed to remove a significant portion of the internal diameter of the cylindrical member proximate to one end thereof. The unmilled or unmachined diameter of the tube is shown as D1 and the milled diameter of the tube is shown as D2. The riser R is drilled to provide three spaced holes. Two of these spaced holes, 28a and 28b, are shown in the riser R for purposes of simplicity of illustration. Holes 28a and 28b extend through the thickness of the riser or bus bar R. A circular steel flange or disc SD having a diameter which generally corresponds to the diameter D2 of the milled away or machined portion of the tube TU is inserted against the shoulder 18 (which is necessarily formed during the milling operation) and rests thereagainst. In the embodiment of the invention shown in FIG. 3, two spaced holes 14a and 14b are made in the steel disc SD. Into the aforementioned holes 14a and 14b push nuts PN may be pressed. After the steel flange or disc SD has been inserted against the shoulder 18, the remaining portion 22 of the end of the tube TU is bent over or spun over or otherwise bent at right angles to the centerline CL of the tube TU to form an annular groove 20 in the tube TU in which the steel flange SD is firmly held. The bent over or spun over portion 22 of the end of the tube TU accomplishes the dual purpose of holding the flange SD against the shoulder 18 and of acting as a pad 23 of relatively large surface area for one of the broad sides of the riser R. The riser R is disposed against the pad 23 to form a right angle joint or connection as is shown in FIG. 3. Appropriate bolts 26a and 26b are inserted through the previously described openings 28a and 28b in the riser R and threaded into the push nuts of the aligned holes 14a and 14b of the flange SD. Appropriate securing torque is applied to the bolt heads of the bolts 26a and 26b to compress the riser R, the portion 22 of the tube TU and the steel flange SD together. The net effect is to decrease contact resistance between the riser R and the tube TU at the region of the pad 23 and to increase the structural integrity of the joint by capturing the extended bent over portion 22 of the tube TU between the flange SD and the riser R.

Figure 4:
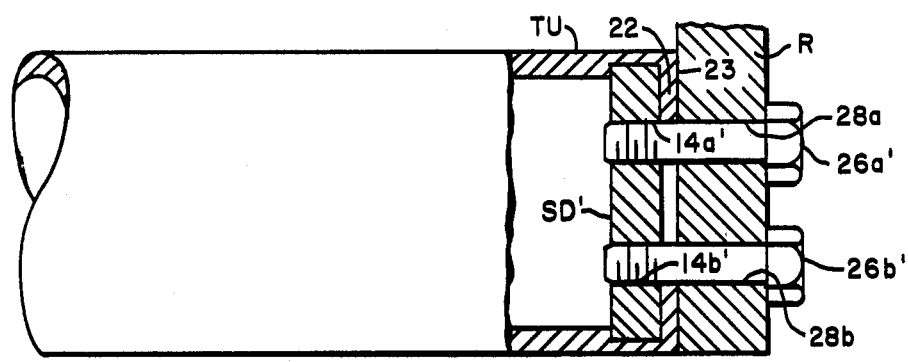
FIG. 4 shows another embodiment of the invention similar to that shown in FIG. 3.

Referring now to FIG. 4, another embodiment of the invention is shown which is very similar to that shown in FIG. 3, except that a steel flange SD' is provided which has drilled and tapped holes 14a' and 14b' disposed therein. These holes are aligned similarly to the holes 14a and 14b of FIG. 3. The riser R is attached to the tube TU in the manner described with respect to FIG. 3, except that bolts 26a' and 26b' are inserted through the holes 28a and 28b. The external thread of the bolts 26a' and 26b' correspond to the internal tapped threads of the holes 14b' and 14b'. As was the case with respect to the embodiment of FIG. 3, the bolts 26a' and 26a' are then tightened or torqued until the riser R and the steel flange or disc SD' compress the bent over or spun over portion 22 of the tube TU therebetween, thus utilizing the surface 23 for support and current transfer.

It is to be understood with respect to the embodiments of the invention that the metal clad switchgear designated MC in FIG. 1 may be similar to the switchgear shown in the previously mentioned U.S. Pat. No. 3,716,684. It is also to be understood that the arrangement shown in FIG. 1 is not limiting. The arrangement of the riser R shown in FIGS. 1, 3 and 4 as being vertical is also not limiting. It is also to be understood that the arrangement of the compartments C1, C2 and C3, as well as the kind of circuit operating equipment CB shown in compartment C2, is not limiting. Although metal clad switchgear is primarily used in high voltage applications, it is also to be understood that this is not necessarily limiting. It is also to be understood that the inventive concept described herein with respect to connecting the tubular member TU to a relatively flat member R is not limited to metal clad switchgear connections. It is envisioned that the inventive concepts associated with the right angle connection shown in FIGS. 3 and 4 are appropriate for any electrical or mechanical connections requiring a tubular member to be connected at right angles to a relatively flat member.

The apparatus taught herein has many advantages. It is very advantageous to utilize a tubular member in high voltage transmission systems in certain situations. The generally circular cross section of the tubular member is best adapted for being interconnected with a radially disposed fingered connector, such as shown in U.S. Pat. No. 2,376,818. Furthermore, it is known that the relatively large surface area to volume ratio of a member of circular cross-sections provides relatively efficient heat dissipation for any given amount of electrical current carried therein. It is also known that a hollow tubular member is well adapted for carrying alternating current because of the well known skin effect associated with alternating electrical current. Another advantage lies in the fact that the necessary interconnection between a tubular member and a riser such as is shown in FIGS. 1, 3 and 4 of the invention, may be done relatively simply and inexpensively, by utilizing the concepts taught in the present invention. In addition, the contact resistance electrical characteristic of the apparatus utilizing the present invention is relatively low because of the large surface area of interface between the relatively flat bus bar or riser R and the tubular member TU. In addition, the structural integrity of the connection is enhanced because of the sandwiching or compression effect of the riser R spun over tab lip 22 and support flange SD or SD', as the case may be shown in FIGS. 3 and 4. Still another advantage lies in the desirable reduction in corona effects due to the relative absence of discontinuities such as sharp edges in the circular conductor.

What I claim as my invention is:

1. Metal clad switchgear, comprising:
   a. metal cabinet means;
   b. bus bar riser means disposed within said cabinet means and adapted to be interconnected with an external circuit;
   c. load line means disposed within said cabinet means and adapted to be interconnected with a load;
   d. a hollow cylindrical electrical conductor, said hollow conductor having a transverse annular groove in the inner surface thereof proximate one end thereof;
   e. flange means disposed in said annular groove;
   f. first securing means disposed in said flange means, said bus bar riser having an opening therein, one surface of said bus bar riser being disposed flush against said end of said hollow conductor transverse to the centerline thereof, said opening aligning with said first securing means of said flange means;
   g. second securing means, said second securing means having a portion which protrudes through said opening in said bus bar riser to cooperate with said first securing means in said flange means to hold said bus bar riser against said end of said hollow conductor in a state of compression; and
   h. circuit control means disposed within said cabinet means in disconnectable disposition with said load line means, said circuit control means having a circular disconnecting terminal which is disposed in disconnectable connection with the other end of said hollow cylindrical conductor.

2. The combination as claimed in claim 1 wherein said second securing means comprises a threaded bolt, the head of which is on the opposite side of said flat conductor from said end of said hollow conductor.

3. The combination as claimed in claim 2 wherein said first securing means comprises a nut which is complementary to said threaded bolt.

4. The combination as claimed in claim 2 wherein said first securing means comprises a tapped hole in said flange, where the threads of said tapped hole are complementary to said threaded bolt.

5. The combination as claimed in claim 1 wherein the relative inner diameter of said hollow tube is smaller between said annular groove and said end of said hollow conductor than it is on the other side of said annular groove to increase the surface area of electrical contact with said flat conductor.

6. The combination as claimed in claim 1 wherein said flange comprises a circular member.

7. The combination as claimed in claim 1 wherein said circular disconnecting terminal comprises radially oriented spring loaded fingers for firmly grasping said other end of said hollow electrical conductor.

* * * * *